Figure 1:
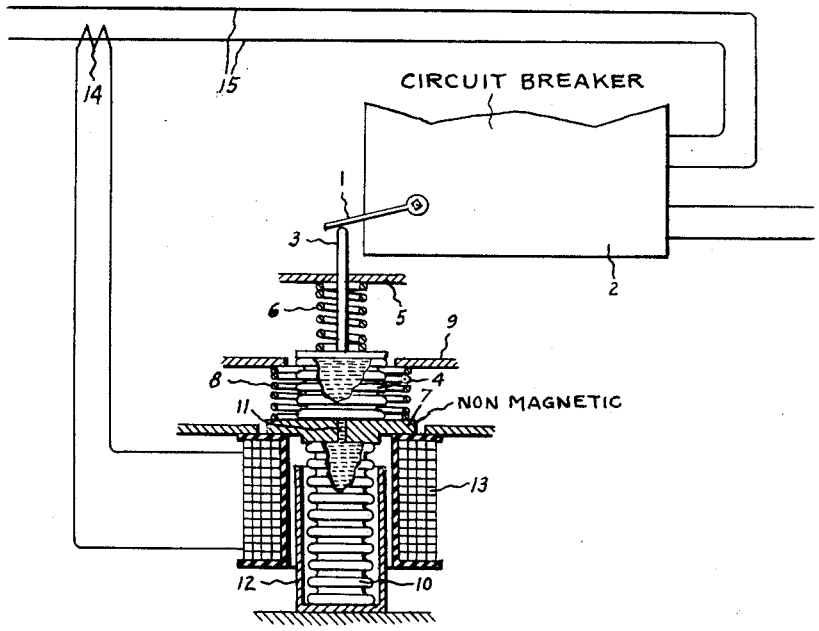

Aug. 5, 1952  C. H. TITUS  2,606,261

ELECTROHYDRAULIC TRIP DEVICE

Filed March 17, 1951

Inventor:
Charles H. Titus,
by Ernest H. Britton
His Attorney.

Patented Aug. 5, 1952

2,606,261

UNITED STATES PATENT OFFICE 2,606,261

ELECTROHYDRAULIC TRIP DEVICE

Charles H. Titus, Philadelphia, Pa., assignor to General Electric Company, a corporation of New York Application March 17, 1951, Serial No. 216,241

1 Claim. (Cl. 200—108)

This invention relates to trip devices for actuating the trip shafts of electric circuit breakers and, more particularly, to such devices employing a hydraulic system to obtain a tripping action whose operating time is dependent upon the seriousness of the fault in the external or controlling circuit.

In many electrical circuits circuit breakers are provided for protection against overcurrents, overvoltages, and other undesirable circuit parameters. Since these undesirable parameters may be of only short duration, it is generally advantageous that there be a time delay in the operation of the circuit breaker, the time delay being inversely proportional to the seriousness of the overcurrent or other parameter. Thus, for example, an overcurrent which would not cause immediate damage to the circuit but would incur damage if left on for an appreciable time, should not cause the breaker to open immediately but should cause it to open before damage results. This, of course, prevents needless opening and closing of the breaker for small overcurrents of short duration. But for serious overcurrents, which are large enough to cause immediate damage to the circuit or to the connected equipment, the trip device should act instantaneously to actuate the circuit breaker.

Heretofore, various trip devices have been used to perform these functions. A particularly effective scheme for obtaining a time delay tripping action has been developed in trip devices which employ a hydraulic system for that purpose. However, these devices possess a serious disadvantage in that they do not provide any means for instantaneously tripping the breaker upon a serious fault in the controlling circuit. Therefore, when such a device has been used, it has been necessary to also provide a separate trip device to obtain the necessary instantaneous tripping action. This obviously results both in a cumbersome and an expensive tripping system.

It is the object of this invention, therefore, to provide an electrohydraulic trip device which provides both a time delay tripping action and a substantially instantaneous tripping action, the selection of the type tripping action depending upon the seriousness of the fault in the controlling circuit.

In this invention, the trip device employs a bellows assembly for providing both a time delay tripping action and an instantaneous tripping action. The bellows assembly includes a compressible container or bellows, an expansible container or bellows, and a movable partition member disposed therebetween. Each of the bellows has an end contacting the movable partition and a relatively movable end remote from the partition, and each contains a quantity of a substantially non-compressible liquid. A passageway is provided between the two bellows by an orifice in the partition member for regulating the rate of relative movement of the relatively movable ends of the bellows. Also included in the bellows assembly are spring means which are disposed between the movable partition member and a fixed member for controlling joint movement of the movable partition member and both of the bellows mounted on the partition member. In some embodiments of the invention, spring means are also disposed between the remote end of one of the bellows and the fixed member.

Upon a fault in the controlling circuit, forces which are proportional to the seriousness of the fault are applied by electromagnetic means to an end of the collapsible bellows. Arranged to have a motion correlated with the movement of that end of the collapsible bellows is a trip rod, which engages the trip shaft of the associated circuit breaker. After a predetermined length of motion of the trip rod, the circuit breaker is opened to clear the circuit.

The length of time required to trip the circuit breaker is proportional to the average speed of movement of the trip rod over its length of travel and thus is inversely associated with the force applied to the collapsible bellows. Depending upon the size of the applied force, the circuit breaker is tripped either substantially instantaneously or after a varying time delay. For the instantaneous tripping action, the restraining effect of the passageway upon liquid flow between the two bellows is such that the resulting forces move the entire bellows assembly so as to effect joint movement of both bellows with the movable partition member in actuating the trip shaft. However, for the time delay tripping action, only the relatively movable ends of the bellows are moved in actuating the trip shaft, the rate of movement depending upon the rate of liquid flow from the collapsible bellows to the expansible bellows as restricted by the passageway.

Figure 2:
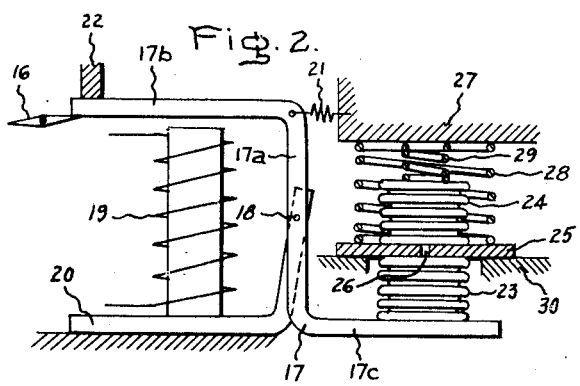

For a better and more complete understanding of my invention, together with additional objects and advantages thereof, reference should now be had to the following description and accompanying drawing, in which:

Fig. 1 is a view in partial section of a preferred embodiment of my invention, together with an associated circuit breaker and the electrical circuit protected thereby; and Fig. 2 is a view in partial section of another embodiment of my invention.

Referring to Fig. 1, the trip shaft 1 of a circuit breaker 2 is actuated by a trip rod 3, which is mounted on the relatively movable end of an expansible container or bellows 4. Also positioned on the relatively movable end of bellows 4 and disposed between it and a fixed member 5, so as to be compressed upon the expansion of bellows 4, is a restraining spring 6. At its other end, bellows 4 is mounted on a movable member or partition 7 which in this particular embodiment is formed of a non-magnetic material. Also mounted on partition 7 is a restraining spring 8. A firm support for the restraining action of spring 8 is provided by a fixed member 9 which spring 8 contacts at its end remote from partition 7.

Partition 7 is in turn secured on a compressible container or bellows 10. A passageway is formed between bellows 4 and 10, both of which are filled with a substantially non-compressible liquid, such as silicone oil, by an orifice 11 in partition 7. Depending upon the desired operating time for the device, liquids covering a wide range of viscosities may be employed. Generally it is preferable to use a liquid having a negligible temperature coefficient of viscosity but the device is not limited to such a liquid, since liquids whose temperature coefficients of viscosity vary greatly have been found satisfactory.

Disposed around a portion of bellows 10 and forming the support for it is a magnetic armature 12, and disposed around armature 12 in a cooperating flux-linking relationship therewith is an electromagnetic coil 13. In the particular embodiment illustrated in Fig. 1, coil 13 also serves as a stop for partition 7 to prevent it from compressing bellows 10 under pressure from spring 8, when coil 13 is de-energized. Coil 13 is energized by a current transformer 14, whose output is proportional to the current in the current carrying line 15, for which circuit breaker 2 provides overcurrent protection.

In operation with a slight overload on line 15, the trip device provides a time delay feature before trip shaft 1 is actuated; however, with an overload so large as to afford immediate danger to the line, trip shaft 1 is actuated substantially instantaneously. With current flowing in line 15, coil 13 is energized and supplies magnetic flux to pull armature 12 upwardly toward partition 7.

This, of course, applies a force on the relatively movable bottom end of bellows 10, the magnitude of the force being proportional to the current flowing in line 15. This force serves to compress bellows 10 and force a quantity of the liquid therein through orifice 11 into bellows 4. The liquid flowing into bellows 4 causes it to expand, although resistance to this expansion is offered by spring 6. The expansion of bellows 4 moves trip rod 3 against trip shaft 1. Thus if bellows 4 expands sufficiently, it will cause circuit breaker 2 to open by actuating the trip latch mechanism.

If the current in line 15 is below the danger level, the force applied to bellows 10, and thus the expansion of bellows 4 as retarded by spring 6, are insufficient to trip circuit breaker 2. However, if the amount of current in line 15 is over the desired maximum magnitude and yet under the magnitude providing immediate danger to the line or to the equipment connected to it, circuit breaker 2 is tripped after a time delay inversely proportional to the magnitude of current. This time delay is provided by the limiting or metering effect of orifice 11 on the rate of transfer of liquid between the two bellows. Naturally, the higher the current, the greater is the force applied to bellows 4 and thus the faster is the flow of liquid through orifices 11 into bellows 4. Since the time delay is inversely proportional to the rate of flow, it is therefore an inverse function of the magnitude of the actuating current. After circuit breaker 2 operates, thereby interrupting the current to coil 13 and ending the compressive force on bellows 10, spring 6 by re-expanding provides for a return of the liquid and the two bellows to the original or de-energized condition shown in Fig. 1.

Since the rate of liquid flow from bellows 4 to bellows 10 is limited due to the metering effect of orifices 11, a force is exerted on partition 7 whenever armature 12 compresses bellows 10. In the time delay action described above, it is assumed that the force due to the overcurrent in line 15 is not sufficient to move partition 7 upwardly jointly with both bellows 4 and 10 against the resistance of spring 8. However, when very large overcurrents, capable of causing immediate damage, flow in line 15, the force exerted on bellows 10 is much greater than is the force exerted during the time delay action described above, and due to the metering effect of orifice 11, a large portion of this force is transferred to partition 7. To provide a substantially immediate triggering action at these excessive currents, the bellows assembly is designed so that at above a certain current in line 15, the force exerted on partition 7 is sufficient to move it jointly with both bellows 4 and 10 upwardly against the restraining force of spring 8 without any time delay. When partition 7 moves, bellows 4 and trip rod 3 move with it to operate circuit breaker 2. In other words, there is an immediate movement of the whole bellows assembly to provide a substantially instantaneous trip for excessive currents. Once circuit breaker 2 has operated, spring 8 returns the bellows assembly to the de-energized position.

Thus, depending upon the seriousness of the overcurrent in line 15, the trip device will provide either a time delay tripping action upon relative movement of the relatively movable ends of bellows 4 and 10 under the restraint provided by the flow regulating passage 11 or a substantially instantaneous tripping action upon joint movement of partition 7 and both of the bellows 4 and 10. Moreover, after circuit breaker 2 has been opened by either action of the trip device, the device returns to the de-energized position so that the circuit breaker may be reclosed.

In Fig. 2 is shown another embodiment of this invention. In this embodiment, a circuit breaker trip shaft 16 is actuated by a combination trip rod and armature member 17, which has a vertically extending portion 17a and oppositely extending horizontal portions 17b and 17c. Member 17 is pivotably mounted by means of a pin 18, which extends through the center of portion 17a, and motion around the pin is provided by the magnetic action of an electromagnetic coil 19, which is positioned on a stationary member 20 in cooperative flux-linking relationship with portion 17b of member 17. This motion is retarded by a spring 21 and by a bellows assembly which is mounted on portion 17c of member 17. When coil 19 is de-energized, spring 21 and the bellows assembly return member 17 to the position shown in Fig. 2, fixed member 22 serving as a stop to prevent further motion.

The bellows assembly mounted on portion 17c of member 17 consists of a collapsible liquid-filled container or bellows 23 and an expansible liquid-filled container or bellows 24, between which is disposed a movable member or partition 25 arranged so that either joint movement of partition 25 with both of the bellows members 23 and 24 or relative movement of the relatively movable ends of bellows 23 and 24 may be obtained. A passageway between the two bellows is provided by an orifice 26, which extends through partition 25 for regulating the rate of relative movement of the relatively movable ends of bellows 23 and 24, while disposed respectively between partition 25 and a fixed member 27, and between the end of bellows 24 remote from partition 25 and member 27, are restraining springs 28 and 29. The restraining spring 28 opposes the joint movement of partition 25 and both of the bellows 23 and 24 while the restraining spring 29 opposes the relative movement of the relatively movable ends of bellows 23 and 24. A stationary member 30 provides a stop to prevent spring 28 from compressing bellows 23 further than is shown in Fig. 2.

The tripping action of this embodiment is much the same as the tripping action of the other embodiment described above. By proper connection of coil 19, the device may be used for overcurrent protection, for overvoltage protection, or for protection against any other dangerous condition in a controlling circuit.

Upon a large enough energization of coil 19 that the pivotal force applied to member 17 is sufficient to overcome the retarding force of spring 21, portion 17b of member 17 will move downwardly, and as member 17 pivots on pin 18, portion 17c will move upwardly. The terms downwardly and upwardly refer to the device as viewed in Fig. 2. As partition 17c moves upwardly, it compresses bellows 23, forcing liquid to flow through orifice 26 into bellows 24, which expands against the resistance of spring 29. Under normal conditions of the controlling circuit, the magnetic force applied to member 17 by coil 19 is not sufficient to actuate the circuit breaker, due to the retarding force supplied by the spring 21 and the bellows assembly. However, with a circuit condition which will be dangerous after a certain period of time, if the circuit is not opened, the force applied by coil 19 is sufficient to compress bellows 26 thereby allowing member 17 to pivot far enough to actuate the circuit breaker (not shown) through trip-shaft 16. The metering effect of orifice 26 provides a time delay action in the collapse of bellows 23 and the expansion of bellows 24. In this way the rate of the relative movement of the relatively movable ends of bellows 23 and 24 is regulated. This, of course, retards the motion of member 17 and provides a time delay in the action of portion 17b of member 17 in turning trip-shaft 16. The time delay is inversely proportional to the force applied to bellows 23 and thus inversely proportional to the seriousness of the fault in the circuit for which protection is desired. Once energization is removed from coil 19, spring 29 re-expands and returns the liquid and the bellows assembly to the original or de-energized position shown in Fig. 2. Spring 21, of course, aids in returning member 17 to the de-energized position.

A substantially instantaneous tripping action upon immediately dangerous faults in the controlling circuit is also provided by this device. Above a certain seriousness of fault and thus above a certain force applied to bellows 23 by member 17, the force on partition 25 due to the metering effect of orifice 26 is sufficient to overcome the retarding force of spring 28, so that the entire bellows assembly moves upwardly thereby effecting joint movement of partition 25 and both of the bellows 23 and 24 without any time delay. Trip shaft 16 is therefore turned without time delay and a substantially instantaneous opening of the controlling circuit is obtained. Upon the resulting de-energization of coil 19, spring 28, aided by the action of spring 21 on member 17, restores the bellows assembly to the original position illustrated. Thus, the same major advantages exist for both embodiments of the invention illustrated in the diagram; namely, they both provide either a time delay trip or an instantaneous trip, depending upon the seriousness of the fault in the controlling circuit, and then return automatically to the de-energized position once the associated circuit breaker has operated to open the circuit.

Various modifications of this invention are readily suggestible. The shape of the combination armature and trip rod member and the manner in which the spring means are disposed enable many different workable devices to be built. However, in order to provide a return to the de-energized position after operation of the device, a common feature of all the modifications is that spring means are placed between the movable partition and a fixed member.

Thus, while there have been described what at present are considered to be the preferred embodiments of this invention, it will be obvious to those skilled in the art that various changes and modifications may be made therein without departing from the invention, and it is, therefore, aimed in the appended claim to cover all such changes and modifications as fall within the true spirit and scope of the invention.

What I claim as new and desire to secure by Letters Patent of the United States is:

In a trip device for a circuit breaker having a trip shaft, a movable partition member, a collapsible container and an expansible container mounted on opposite sides of said movable partition member for joint movement of both containers with the movable partition member, each container being filled with liquid and having a relatively movable end remote from said movable partition member, a liquid flow regulating passage connecting said containers through said partition member for regulating the rate of relative movement of the relatively movable ends of the containers upon collapse of the collapsible container, calibrating spring means connected with said movable partition member for opposing the joint movement of the partition member and both containers, electroresponsive means for applying operating forces to the relatively movable end of said collapsible container to effect joint movement of both containers with the partition member when the operating force is greater than the opposing force of the calibrating spring means and to effect relative movement of the relatively movable end of the collapsible container when the operating force is less than the opposing force of the calibrating spring means, and a trip shaft actuating member having connections for effecting movement thereof in accordance with the movement of the relatively movable end of said collapsible container.

CHARLES H. TITUS.

REFERENCES CITED

The following references are of record in the file of this patent:

UNITED STATES PATENTS

| Number | Name | Date |
|---|---|---|
| 729,014 | Thornton | May 26, 1903 |
| 1,123,288 | Hellmund | Jan. 5, 1915 |
| 1,330,094 | Simon | Feb. 10, 1920 |

FOREIGN PATENTS

| Number | Country | Date |
|---|---|---|
| 619,477 | Great Britain | Mar. 9, 1949 |
| 642,711 | France | Sept. 3, 1928 |